(12) United States Patent  
Lin

(10) Patent No.: US 8,749,902 B2  
(45) Date of Patent: Jun. 10, 2014

(54) LENS MODULE

(75) Inventor: Tsung-Yu Lin, New Taipei (TW)

(73) Assignee: Wcube Co., Ltd., George Town (KY)

( * ) Notice: Subject to any disclaimer, the term of this patent is extended or adjusted under 35 U.S.C. 154(b) by 48 days.

(21) Appl. No.: 13/455,338

(22) Filed: Apr. 25, 2012

(65) Prior Publication Data

US 2013/0063831 A1    Mar. 14, 2013

(30) Foreign Application Priority Data

Sep. 8, 2011   (TW) .............................. 100132367 A

(51) Int. Cl.
- *G02B 7/02* (2006.01)
- *G02B 3/00* (2006.01)
- *G02B 9/12* (2006.01)

(52) U.S. Cl.
CPC ............... *G02B 3/0081* (2013.01); *G02B 3/00* (2013.01); *G02B 9/12* (2013.01)
USPC ............................ 359/823; 359/645; 359/740

(58) Field of Classification Search
CPC .......... G02B 3/0081; G02B 3/00; G02B 9/12; G02B 7/02
USPC ......... 359/683, 689–690, 694–698, 702–706, 359/716, 738–740, 748, 753–754, 784–792, 359/823–826
See application file for complete search history.

(56) References Cited

U.S. PATENT DOCUMENTS 8,542,451 B2 * 9/2013 Lu et al. ..................... 359/819  
2003/0193605 A1 * 10/2003 Yamaguchi .................. 348/335

* cited by examiner

*Primary Examiner* — Scott J Sugarman  
*Assistant Examiner* — Vipin Patel  
(74) *Attorney, Agent, or Firm* — Novak Druce Connolly Bove + Quigg LLP

(57) ABSTRACT

A lens module comprises a barrel, a first lens, a first spacer ring, a second lens having an effective aperture A, a second spacer ring having an inner diameter B, and a third lens having an effective aperture C. The first lens, the first spacer ring, the second lens, the second spacer ring, the third lens and the infrared cut-off filter are coaxially assembled within the barrel, along an axial direction of the barrel in that order. The first spacer ring is sandwiched between the first lens and the second lens, the second spacer ring is sandwiched and located between the second lens and the third lens. The inner diameter B of the second spacer ring is smaller than the effective aperture C of the third lens and larger than the effective aperture A of the second lens, so as to satisfy the condition of C>B>A.

10 Claims, 3 Drawing Sheets

LENS MODULE

BACKGROUND

1. Technical Field

The present disclosure generally relates to a lens module.

2. Description of Related Art

In order to improve the relative illumination (RI) of the lens module, the relative illumination curve of the traditional lens module formed under the field of view ranged from 1.0 to 1.2 millimeters is generally designed to be relatively flat, during the optical design stage. However, because of the manufacturing error, the actual relative illumination curve of the lens module formed under the field of view ranged from 1.1 to 1.2 millimeters is often significantly bent or tapered as shown in section 'a' of FIG. 1. The bent or tapering phenomenon of the relative illumination curve may cause the failure of relative uniformity (RU) in an optical quality test.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
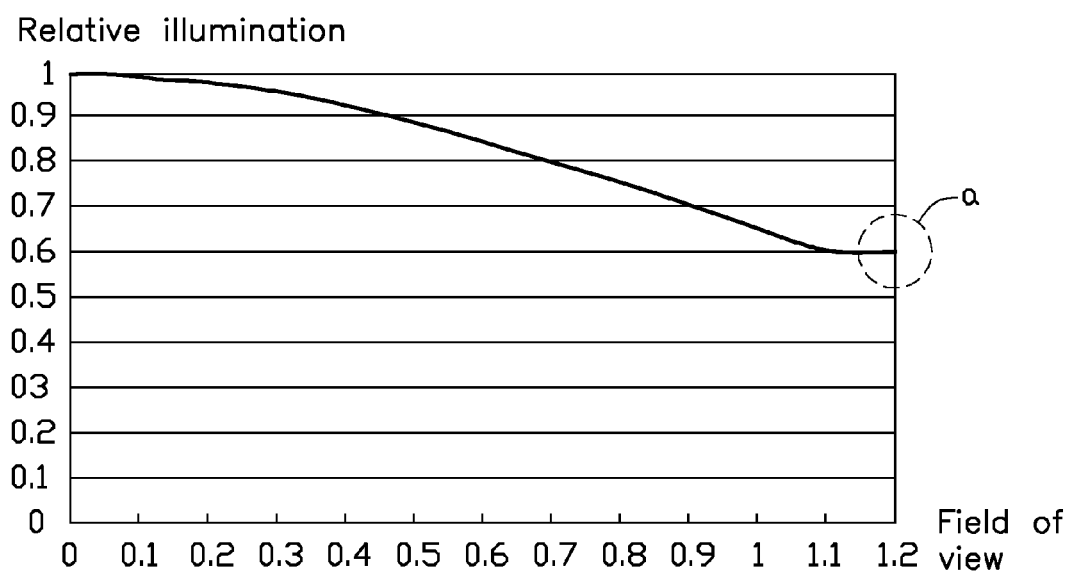
FIG. 1 shows a view of a relative illumination curve of an existing lens module.
Figure 2:
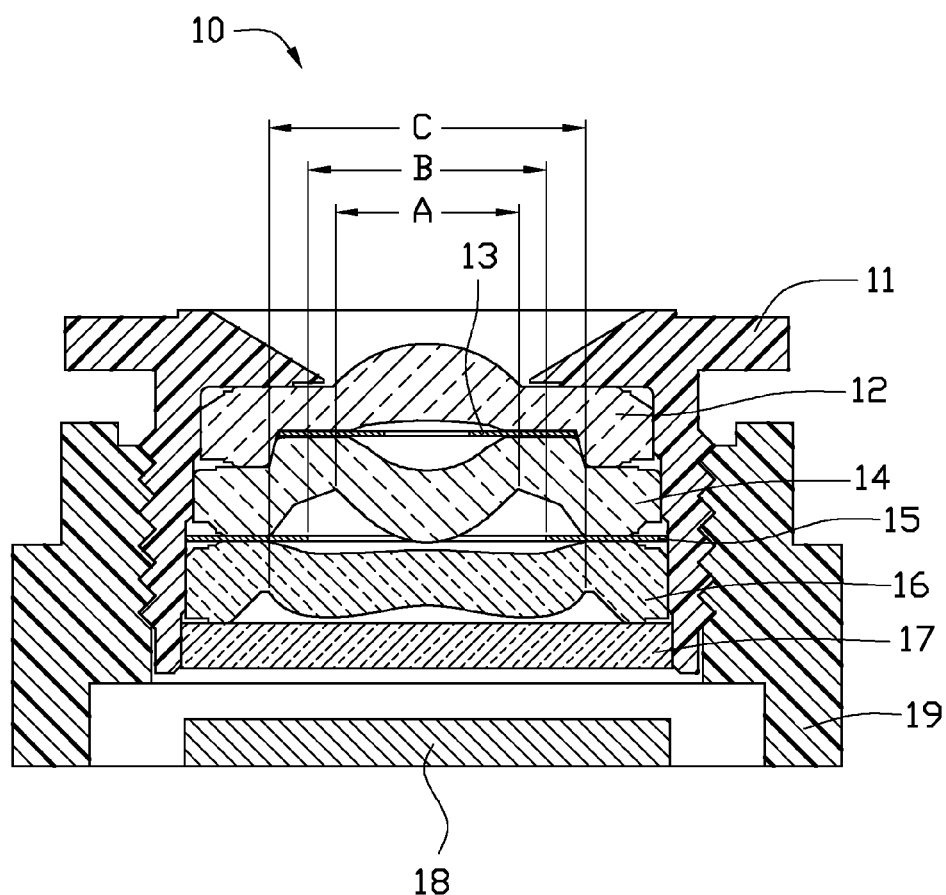
FIG. 2 shows a cross sectional view of an embodiment of a lens module.

FIG. 2, is an embodiment of a lens module 10 including a barrel 11, a first lens 12, a first spacer ring 13, a second lens 14, a second spacer ring 15, a third lens 16, an infrared cut-off filter 17, an image sensor 18, and a lens base 19. The barrel 11 is adjustably assembled to the lens base 19 via screw thread engagement. In the illustrated embodiment, one end of the barrel 11 is received into and rotatably engaged with a top end of the lens base 19, such that, the barrel 11 is rotatable relative to the lens base 19 and is capable of being axially adjusted relative to the lens base 19, thereby changing a length of the whole lens module 10.

The first lens 12, the first spacer ring 13, the second lens 14, the second spacer ring 15, the third lens 16 and the infrared cut-off filter 17 are coaxially assembled within the barrel 11, along an axial direction of the barrel 11 toward the lens base 19 in that order. In this embodiment, the first spacer ring 13 functions as an aperture and is sandwiched between the first lens 12 and the second lens 14, for spacing the first lens 12 and the second lens 14, and controlling the luminous flux of the lens module 10. The second spacer ring 15 is sandwiched and located between the second lens 14 and the third lens 16 for spacing the second lens 14 and the third lens 16. The infrared cut-off filter 17 is assembled within a distal end of the barrel 11, away from the first lens 12, and resists against the corresponding third lens 16, coaxially.

An effective diameter of the second lens 14 is defined as A, an inner diameter of the second spacer ring 15 is defined as B, and an effective diameter of the third lens 16 is defined as C. The inner diameter B of the second spacer ring 15 is smaller than the effective diameter C of the third lens 16, but greater than the effective diameter A of the second lens 14. In other words, the effective diameter C of the third lens 16, the inner diameter B of the second spacer ring 15, and the effective diameter A of the second lens 14 meets a constraining condition presented as follow: C>B>A.

In one embodiment, the effective diameter C of the third lens 16 is 0.876 mm, and the effective diameter A of the second lens 14 is 0.607 mm. The inner diameter B of the second spacer ring 15 can be 0.78 mm, 0.774 mm or 0.764 mm in accordance with the constraining condition of C>B>A. In addition, the effective diameter C of the third lens 16, the inner diameter B of the second spacer ring 15, and the effective diameter A of the second lens 14 satisfy and meet the relationships presented in the following equations:

$$0.098 \le \frac{C-B}{C} \le 0.128; \quad (1)$$

$$0.259 \le \frac{B-A}{A} \le 0.301. \quad (2)$$

The image sensor 18 is assembled within the lens base 19, and coaxially positioned in front of the corresponding infrared cut-off filter 17.

Figure 3:
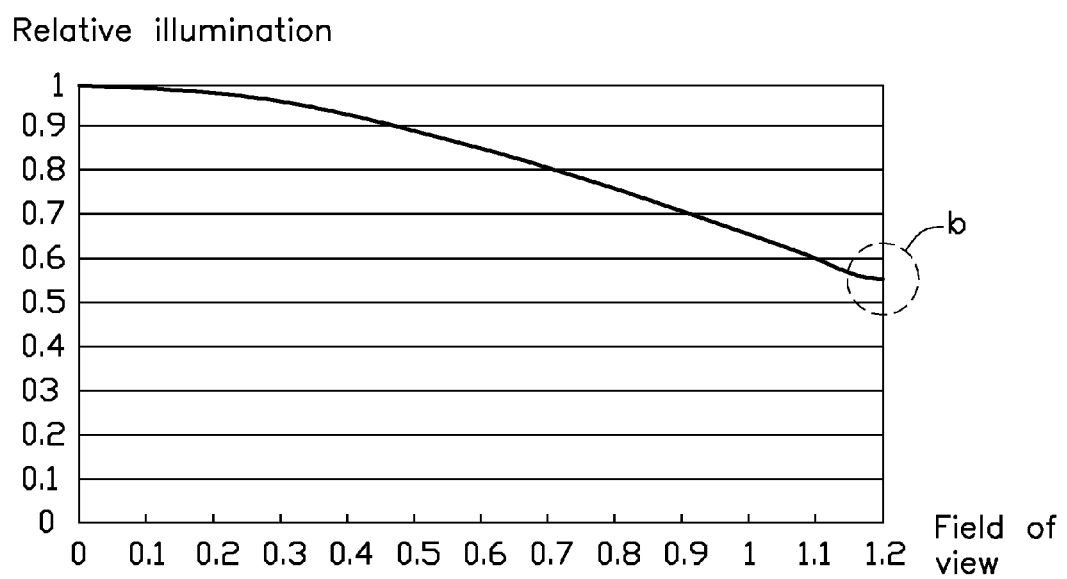
FIG. 3 shows a view of a relative illumination curve of the lens module of FIG. 2.

In use, the outside light may enter into the barrel 11 and pass through the corresponding first lens 12, the second lens 14, the third lens 16 and the infrared cut-off filter 17, in that order, and finally forms an image on the image sensor 18. The distance between the image sensor 18 and the barrel 11 can be adjusted by rotating the barrel 11. Since the inner diameter B of the second spacer ring 15 is larger than the effective diameter A of the second lens 14 and is smaller than the effective diameter C of the third lens 16, the peripheral luminance of the outside light that finally projects on the image sensor 18 is efficiently decreased, thus, the luminance of the periphery of the image sensor 18 is accordingly decreased. The corresponding relative illumination curve of the lens module 10 formed under the field of view ranging from 1.0 to 1.2 millimeters is gently or slightly declined or tapered as shown in section 'b' of FIG. 3, therefore, the embodiment of the lens module 10 thereby avoids the significant tapering phenomenon efficiently as shown in the relative illumination curve of the conventional lens module.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A lens module, comprising:
a barrel;
a first lens;
a first spacer ring;
a second lens having an effective diameter A;
a second spacer ring having an inner diameter B; and
a third lens having an effective diameter C;
wherein, the first lens, the first spacer ring, the second lens, the second spacer ring, and the third lens are coaxially assembled within the barrel, along an axial direction of the barrel in that order; the first spacer ring is sandwiched between the first lens and the second lens, the second spacer ring is sandwiched and located between the second lens and the third lens; the inner diameter B of the second spacer ring is smaller than the effective diameter C of the third lens and greater than the effective diameter A of the second lens;

wherein the effective diameter C of the third lens, the inner diameter B of the second spacer ring, and the effective diameter A of the second lens meet the relationships presented in the following equations:

$$0.098 \le \frac{C-B}{C} \le 0.128 \text{ and } 0.259 \le \frac{B-A}{A} \le 0.301.$$

2. The lens module of claim 1, wherein the effective diameter C of the third lens is 0.876 mm, the effective diameter A of the second lens 14 is 0.607 mm; the inner diameter B of the second spacer ring is 0.78 mm, 0.774 mm or 0.764 mm.

3. The lens module of claim 1, further comprising an infrared cut-off filter, wherein the infrared cut-off filter is assembled within a distal end of the barrel, away from the first lens, and resists against the corresponding third lens, coaxially.

4. The lens module of claim 3, further comprising an image sensor and a lens base adjustably assembled to the barrel, wherein the image sensor is assembled within the lens base and coaxially positioned in front of the corresponding infrared cut-off filter.

5. The lens module of claim 4, wherein one end of the barrel is received into and rotatably engaging with a top end of the lens base, such that, the barrel is rotatable relative to the lens base and is capable of being axially adjusted relative to the lens base thereby changing a length of the whole lens module.

6. The lens module of claim 5, wherein the barrel is adjustably assembled to the lens base via screw thread engagement.

7. A lens module, comprising:
a barrel;
a lens base coaxially and rotatably assembled to one end of the barrel;
a first lens;
a first spacer ring;
a second lens having an effective diameter A;
a second spacer ring having an inner diameter B; and
a third lens having an effective diameter C;
wherein, the first lens, the first spacer ring, the second lens, the second spacer ring, and the third lens are coaxially assembled within the barrel, along an axial direction of the barrel toward the lens base in that order; the first spacer ring is sandwiched between the first lens and the second lens, the second spacer ring is sandwiched and located between the second lens and the third lens;
wherein, the inner diameter B of the second spacer ring is smaller than the effective diameter C of the third lens and greater than the effective diameter A of the second lens;
wherein the effective diameter C of the third lens, the inner diameter B of the second spacer ring, and the effective diameter A of the second lens meet the relationships presented in the following equations:

$$0.098 \le \frac{C-B}{C} \le 0.128 \text{ and } 0.259 \le \frac{B-A}{A} \le 0.301.$$

8. The lens module of claim 7, further comprising an infrared cut-off filter and an image sensor, wherein the infrared cut-off filter is assembled within the barrel, away from the first lens, and resists against the corresponding third lens, coaxially; the image sensor is assembled within the lens base and coaxially positioned in front of the corresponding infrared cut-off filter.

9. The lens module of claim 8, wherein one end of the barrel is rotatably engaging into a top end of the lens base, the barrel is capable of being axially adjusted relative to the lens base thereby changing a distance between the image sensor and the barrel, and adjusting a whole length of the lens module.

10. The lens module of claim 9, wherein the barrel is adjustably assembled to the lens base via screw thread engagement.

* * * * *